United States Patent

Voelkl

[15] 3,675,094

[45] July 4, 1972

[54] IMPREGNATED SELF-HEALING ALTERNATING VOLTAGE CAPACITOR

[72] Inventor: Walter Voelkl, Munich, Germany

[73] Assignee: Siemens Aktiengesellschaft, Berlin and Munich, Germany

[22] Filed: June 22, 1971

[21] Appl. No.: 155,484

[30] Foreign Application Priority Data

June 25, 1970 Germany ..................... P 20 31 741.3

[52] U.S. Cl. ............................. 317/258, 29/25.42, 317/260
[51] Int. Cl. ..................................................... H01g 3/215
[58] Field of Search ..................... 317/258, 260; 29/25.42

[56] References Cited

UNITED STATES PATENTS 3,248,620  4/1966  Haft et al. ............................. 317/260

FOREIGN PATENTS OR APPLICATIONS 876,274  3/1953  Germany ............................. 317/260

Primary Examiner—E. A. Goldberg
Attorney—Hill, Sherman, Meroni, Gross & Simpson

[57] ABSTRACT

An AC voltage capacitor employs a pair of layers of varnish with a metallic layer therebetween to form one electrode of the capacitor, the layer structure being carried by a second layer structure including a rough surface dielectric having metallic layers on both sides which are electrically connected together to form the other electrode of the capacitor.

5 Claims, 3 Drawing Figures

PATENTED JUL 4 1972  3,675,094

INVENTOR
Walter Voelkl
BY
ATTYS.

IMPREGNATED SELF-HEALING ALTERNATING VOLTAGE CAPACITOR

BACKGROUND OF THE INVENTION

1. Field of the Invention

This invention relates to an impregnated self-healing AC voltage capacitor, and is particularly concerned with such a capacitor wherein an electrode comprises a pair of electrically connected metallic layers between which there is provided an insulation material having a rough surface and/or porous composition wherein the metallic layers are applied immediately to both surfaces of the insulating material.

2. Description of the Prior Art

The German Pat. No. 832,640 discloses a self-healing coiled capacitor wherein each electrode thereof comprises a pair of electrically connected metallic layers carried on a paper foil. The dielectric material of this particular capacitor consists, for example, of polystyrene and the capacitor is not impregnated.

In a previously filed German patent application P 15 64 792.4 (S 107,565 VIIIc/21g) an impregnated capacitor is disclosed which utilizes a plastic foil as the dielectric material. In this particular capacitor, the electrodes also consist of bi-laterally metallized insulating material insertions. Each of these metallizations carried by the plastic foil are electrically connected and the insulating material is therefore disposed in a field-free area between these metal layers. This type of capacitor can be operated at high voltages. In case of a disruptive discharge, there is a high energy flow to the point of disruptive discharge.

SUMMARY OF THE INVENTION

The primary object of the present invention resides in the provision of a capacitor as initially described with a star-like micro fissure structure to limit the energy flow in case of a disruptive discharge to the point of discharge in one of the metallizations forming part of an electrode.

The foregoing objective is realized with the aid of a feature of the present invention which provides that along with the bi-laterally metallized insert of insulating material, two varnish layers and a metallic layer arranged therebetween are processed into a capacitor, whereby the metallic layer disposed between the two varnish layers forms the counter electrode with respect to the two metallizations carried by the insert of insulating material.

A micro fissure structure can be produced in the metallic layer that is disposed between the two varnish layers acting as dielectric material. The varnish layer located below (as viewed in the drawings) the metallic layer is swelled on or dissolved on by the solvent of the second varnish layer. The intermediate metallic layer is torn up in a star-like pattern by the swelling on process. The star-like pattern in the metallic layer limits, in case of a disruptive discharge, the energy flowing to the point of disruptive discharge and thereby avoids destruction of the adjacent layers of the capacitor during the healing process.

The book by L. Holland "Vacuum Deposition of Thin Films," London (1961), pages 367 to 369 discloses that a metal layer may be disadvantageously torn up when varnishing over a metal layer which has been applied to lacquer as determined in the plastic or automotive industry.

The capacitor design according to the present invention can be produced in that both varnish layers with the metallic layer therebetween are designed as thin foils, and during coiling or stacking, they are applied to the bilaterally metallized insert of insulating material.

A second possibility for producing the capacitor according to the present invention provides that the varnish layers and the metallic layer be applied consecutively to one of the metallized surfaces of the insert of insulating material to form a single consistent layer arrangement. A single layer arrangement suffices to produce a capacitor, for example, by coiling whereby the possibility of automation of the winding or coiling operation is decisively improved.

BRIEF DESCRIPTION OF THE DRAWINGS

Other objects, features and advantages of the invention, its organization, construction and operation will best be understood from the following detailed description of exemplary embodiments thereof taken in conjunction with the accompanying drawings, in which.

DESCRIPTION OF THE PREFERRED EMBODIMENTS

Figure 1:
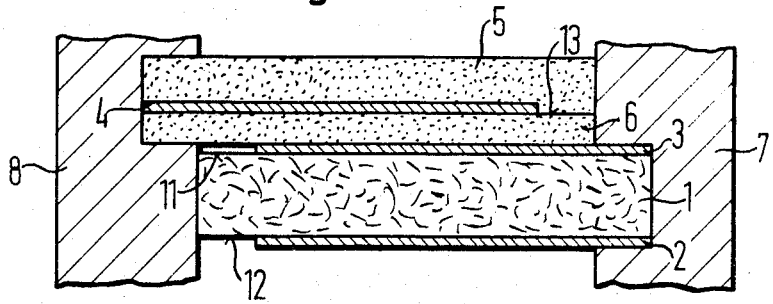
FIG. 1 is an exaggerated cross-sectional view of a capacitor which may be in a coiled or stacked configuration wherein the bilaterally metallized insert of insulating material is processed with a thin foil consisting of two varnish layers and an intermediate metallic layer embedded therebetween.

FIG. 1 illustrates a capacitor structure comprising a layer 1 of insulating material having a rough surface and/or a porous composition, which layer may advantageously consist of paper. The layer of insulating material 1 carries on opposite sides thereof a pair of metallizations or metallic layers 2,3. The metallic layers 2 and 3 are seized for electrical contact by a contact layer 7 which is applied to a frontal side of the capacitor to form a short circuit. A pair of metal-free marginal strips 11, 12 are provided at the opposite frontal side of the capacitor for better insulation of each of the metal layers 2, 3. Both metal layers 2 and 3 form an electrode of the capacitor. The other or counter electrode is formed by a metallic layer 4 which is located between a pair of varnish layers 5, 6. Both of the varnish layers 5 and 6, and the interposed metallic layer 4, are advantageously formed as a thin foil structure which is produced by being varnished or steamed on an auxiliary carrier foil from which the structure is removed for application to the capacitor structure. The metallic layer 4 is seized for electrical contact at the aforementioned opposite frontal side by a second frontal contact layer 8. The metallic layer 4 is insulated from the frontal side of the capacitor which carries the frontal contact layer 7 by the provision of a metal-free marginal strip 13. The thin foil structure consisting of both varnish layers 5, 6 and the metallic layer 4 located therebetween is coiled in a staggered manner with respect to the bilaterally metallized insulating layer 1, so that an improved contact is produced with the frontal contact layers 7, 8 and an improved insulation of the metallic layers with respect to these contact layers is also provided.

Figure 2:
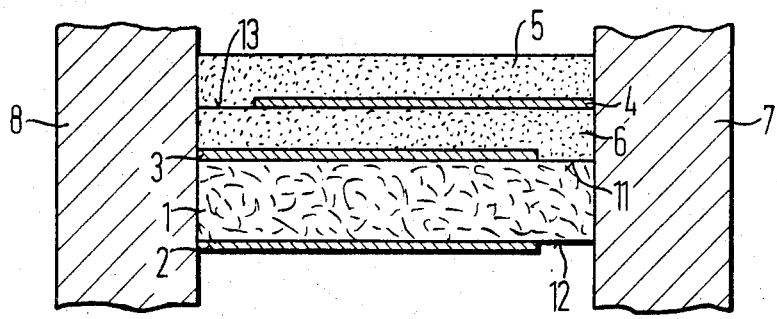
FIG. 2 is an exaggerated cross-sectional view of a capacitor which may be made in the form of a coil or stacked capacitor wherein a pair of varnish layers and an intermediate metallic layer are immediately applied to a bilaterally metallized insert of insulating material.

FIG. 2 likewise illustrates a bilaterally metallized insulating material insert 1 with a rough surface, which again may consist of paper. The metallic layers 2, 3 which are directly applied to the layer 1 and which are electrically connected together by a frontal contact layer 8 again form an electrode for the capacitor. These metallizations are insulated with respect to the frontal contact layer 7 on the opposite frontal side of the capacitor by the provision of metal-free marginal strips 11, 12. The counter electrode is formed by a metallic layer 4 which is embedded between a pair of varnish layers 5 and 6. The metallic layer 4 is seized by the frontal contact layer 7 and is insulated from the frontal contact layer 8 by the provision of a metal-free insulating marginal strip 13. In manufacturing the arrangement illustrated in this Figure, the varnish layer 6 is applied directly to one of the metallized sides of the insulating material layer 1, here to the layer 3, and the second varnish layer 5 is applied thereover subsequent to the provision of the metallic layer 4. When producing a coiled capacitor, only one layer structure of the type illustrated in FIG. 2 is necessary so that a single foil results which considerably facilitates the possibility of employing automated production techniques.

Figure 3:
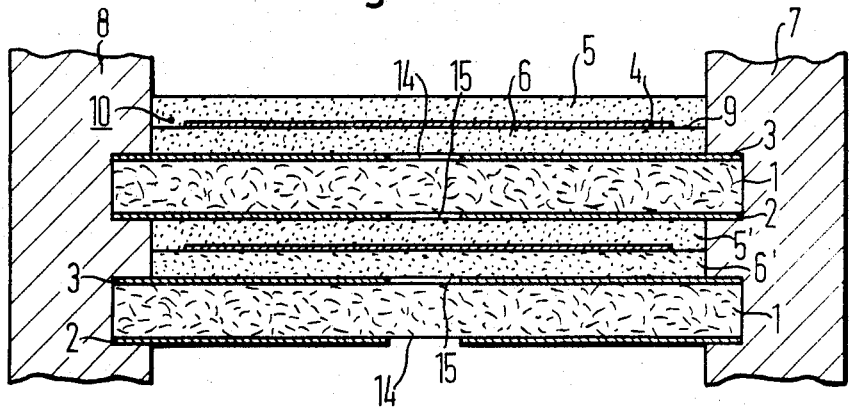
FIG. 3 is an exaggerated cross-sectional view of a capacitor according to the invention which may be made in either a coiled or stacked form and which has an internal series circuit.

FIG. 3 illustrates a capacitor according to the present invention wherein the metallic layers 2, 3 are applied on opposite sides of an insulating material layer 1. The metallic layers 2 and 3 extend as far as both frontal surfaces of the capacitor at which points they are seized by the frontal contact layers 7 and 8 which serve to receive an application of reverse polarity.

The metallic layers 2 and 3 comprise continuous metal-free strips 14, 15 which extend in the center of the capacitor parallel to the frontal surfaces. Both halves of each of the metallic layers 2 and 3 are insulated with respect to each other by these metal-free strips. One half of each of the metallic layers 2 and 3 is gripped by the contact surface 7 and the other halves of each of these layers are seized by the frontal contact surface 8 which is to carry a reverse polarity. The metallic layer disposed between the pair of varnish layers 5 and 6 forms a blind coat. The metallic layer 4 is not seized by either of the frontal contact layers 7, 8 and is insulated from these contact layers by non-metallic strips 9 which extend parallel to the frontal contact surfaces. An internal series circuit is provided in the capacitor design illustrated in FIG. 3. Both of the varnish layers 5, 6 may be placed with the interposed metallic layer 4 as thin foils in the capacitor body or on one of the metallized surfaces of the insulating material 1 as an immediate application to such surface. The advantage of the embodiment illustrated in FIG. 3 resides in the fact that with the aid of the internal series circuit, a 2-layer structure is accomplished with half the number of varnish applications. The capacitor design represented in FIG. 1 can be impregnated without any problem. An impregnating means can penetrate the interior of the capacitor body without trouble from the frontal sides into the air gaps formed between the rough surfaces of the layer 1 and the smooth surfaces of the varnish layers 5 and 6.

In the structure represented in FIG. 2, the impregnating means can penetrate through the air gaps between the unvarnished surface of the insulating layer 1 bearing the metallic layer 2 and the smooth surface of the varnish layer 5 from the frontal sides into the interior of the capacitor.

To produce the micro fissure structures in the metallic layers 4 and 4', the solvents for the varnish layers 5 and 5' must be so selected that they swell on or dissolve on the varnish layers 6 and 6'. By selecting acetyl cellulose for the varnish layers 6 and 6', low acetic acid esters are utilized as varnish solvent for the layers 5 and 5'. Mixtures are applicable particularly for varnish solvents which consist of about 50 percent acetic acid methyl ester, about 45 percent acetic acid ethyl ester and about 5 percent methyl alcohol, also about 25 percent methyl acetate, about 23 percent ethyl acetate, about 2 percent methanol and about 50 percent methylene chloride. The acetyl cellulose varnish solution has a solid body content of less than 10 percent and a viscosity in the order of 240 cP. The solid body content is selected in particular at about 6 percent. Such solvents are described in a previous German patent application Ser. No. P 14 39 314.

The present invention makes possible an impregnated electrical capacitor with high capacitive values comprising a varnish dielectric and is operable for AC voltage applications and has good regenerative properties.

Although I have described my invention by reference to specific illustrative embodiments thereof, many changes and modifications may become apparent to those skilled in the art without departing from the spirit and scope of my invention, and it is to be understood that I intend to include within the scope of the patent warranted hereon all such changes and modifications as may reasonably and properly be included within the scope of my contribution to the art.

I claim:

1. An impregnated self-healing AC voltage capacitor comprising a first electrode including a pair of parallel spaced electrically connected metallic layers and a rough surface layer of insulating material carrying said metallic layers, a first varnish layer disposed adjacent one of said metallic layers, a second varnish layer and a third metallic layer forming a second electrode sandwiched between said first and second varnish layers.

2. A capacitor according to claim 1, wherein said first and second varnish layers and said third metallic layer are thin foils and said first varnish layer adheres to said one metallic layer.

3. A capacitor according to claim 1, comprising metallic contact layers, said layer of said pair of metallic layers extending between said contact layers and including a gap therein to form pairs of side by side metallic layer portions, first non-metallic strips extending across said gaps to insulate said portions from each other and said non-metallic insulation strips disposed between said third metallic layer and said metallic contact layers.

4. A method of making an AC voltage capacitor comprising the steps of: metallizing both sides of a rough surface dielectric layer, and applying to one metallized surface a layer structure of a pair of varnish layers having a metal layer therebetween.

5. The method of claim 4, further defined in that the step of applying the layer structure includes the steps of: applying a first layer of varnish to the one metallized surface, metallizing a layer on a portion of the first layer of varnish, and applying a second layer of varnish over the metallized layer and metal-free portions of the first layer of varnish.

* * * * *